United States Patent
Nasser et al.

(10) Patent No.: US 12,099,452 B2
(45) Date of Patent: *Sep. 24, 2024

(54) DEVICE AND METHOD OF SECURE DECRYPTION BY VIRTUALIZATION AND TRANSLATION OF PHYSICAL ENCRYPTION KEYS

(71) Applicant: Renesas Electronic Corporation, Tokyo (JP)

(72) Inventors: Ahmad Nasser, Livonia, MI (US); Eric Winder, Novi, MI (US)

(73) Assignee: Renesas Electronic Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/336,737

(22) Filed: Jun. 16, 2023

(65) Prior Publication Data

US 2023/0333992 A1 Oct. 19, 2023

Related U.S. Application Data

(63) Continuation of application No. 17/404,543, filed on Aug. 17, 2021, now Pat. No. 11,709,786.

(60) Provisional application No. 63/181,783, filed on Apr. 29, 2021.

(51) Int. Cl.
G06F 12/14 (2006.01)
(52) U.S. Cl.
CPC ...... *G06F 12/1408* (2013.01); *G06F 12/1425* (2013.01); *G06F 12/145* (2013.01); *G06F 12/1475* (2013.01)

(58) Field of Classification Search
None
See application file for complete search history.

(56) References Cited

U.S. PATENT DOCUMENTS

| | | | |
|---|---|---|---|
| 7,073,059 B2 | 7/2006 | Worely, Jr. et al. | |
| 9,547,779 B2 | 1/2017 | Mittal | |
| 10,303,621 B1 * | 5/2019 | Diamant | G06F 12/1408 |
| 10,924,508 B2 | 2/2021 | Raman et al. | |
| 2003/0133574 A1 * | 7/2003 | Caronni | G06F 21/78 |
| | | | 711/E12.095 |
| 2007/0180515 A1 * | 8/2007 | Danilak | G06F 21/79 |
| | | | 726/16 |

(Continued)

OTHER PUBLICATIONS

Extended European Search Report on EP Application No. 22167722.2 dated Sep. 27, 2022, 8 pages.

*Primary Examiner* — Yaima Rigol
(74) *Attorney, Agent, or Firm* — Foley & Lardner LLP

(57) ABSTRACT

Example implementations include a system of secure decryption by virtualization and translation of physical encryption keys, the system having a key translation memory operable to store at least one physical mapping address corresponding to at least one virtual key address, a physical key memory operable to store at least one physical encryption key at a physical memory address thereof; and a key security engine operable generate at least one key address translation index, obtain, from the key translation memory, the physical mapping address based on the key address translation index and the virtual key address, and retrieve, from the physical key memory, the physical encryption key stored at the physical memory address.

10 Claims, 6 Drawing Sheets

(56) References Cited

U.S. PATENT DOCUMENTS

| | | | |
|---|---|---|---|
| 2009/0037682 A1* | 2/2009 | Armstrong | G06F 9/45558 718/1 |
| 2009/0214040 A1* | 8/2009 | Funk | H04L 9/088 380/277 |
| 2012/0246489 A1* | 9/2012 | Brelot | G06F 12/1408 713/193 |
| 2015/0095661 A1* | 4/2015 | Sell | G06F 12/1408 713/193 |
| 2015/0309999 A1* | 10/2015 | Ng | G06F 16/278 707/809 |
| 2019/0042402 A1* | 2/2019 | Chhabra | G06F 9/45558 |
| 2020/0004959 A1* | 1/2020 | Chappell | G06F 12/0842 |
| 2020/0089625 A1* | 3/2020 | Wallach | H04L 9/0894 |
| 2020/0201786 A1* | 6/2020 | Ouziel | G06F 12/0246 |
| 2020/0201787 A1* | 6/2020 | Shanbhogue | G06F 12/1408 |

\* cited by examiner

300

| Key Index Start Address Register(s) 310 | Partition 0 Key Count Register(s) 320 | Partition 1 Key Count Register(s) 322 | Partition 2 Key Count Register(s) 324 | ••• | Partition N Key Count Register(s) 326 |

Fig. 3

DEVICE AND METHOD OF SECURE DECRYPTION BY VIRTUALIZATION AND TRANSLATION OF PHYSICAL ENCRYPTION KEYS

CROSS-REFERENCE TO RELATED PATENT APPLICATIONS

This application is a continuation of U.S. patent application Ser. No. 17/404,543 filed Aug. 17, 2021, which claims priority to U.S. Provisional Patent Application Ser. No. 63/181,783, entitled "VIRTUAL MACHINE ACCESS PROTECTION WITH CANSEC," filed Apr. 29, 2021, the contents of such applications being hereby incorporated by reference in their entireties and for all purposes as if completely and fully set forth herein.

TECHNICAL FIELD

The present implementations relate generally to encryption devices, and more particularly to secure decryption by virtualization and translation of physical encryption keys.

BACKGROUND

Electronic and digital networks are increasingly common in more and more machines. These machine-centric networks carry increasingly complex instructions that control increasingly complex and sensitive aspects of machine operations. This increasing complexity accordingly increases vulnerability and risk to the network from malicious external systems. Thus, communication within and with these networks is subject to increasing security threats to compromise those systems to obtain secure information on those networks and to seize unauthorized control of the machines having and controlled by those networks. Even security protocols themselves are at risk for corruption by malicious external interference.

SUMMARY

Present implementations are directed at least to providing secure network communication including multiple levels of protection for encryption keys providing access to sensitive communications across the network. Protection provided by present implementations includes, but is not limited to, providing physical encryption keys on a secure memory device with restrictions on direct addressing, creating virtual address for physical encryption keys for access from any device external to the secure memory device, and restricting access to virtual encryption keys on a per-partition basis. Partitions determining secure access address blocks accessible by particular components and devices on the network can be based on an identity of a particular virtual machine executing on or in communication with the network. he network can include but is not limited to an embedded system operating on a vehicle, automobile, locomotive, aircraft, watercraft, or spacecraft, for example. Present implementations can thus provide multiple security layers including a restriction on access to the physical key memory and the keys stored therein, and on access to addresses to those physical keys. Restricting access to both physical keys and physical key addresses provides multiple layers of protection and reduces the number of potential intrusion points to the network, by obfuscating the location of physical encryption keys as well as restricting access to those encryption keys. Thus, a technological solution for secure decryption by virtualization and translation of physical encryption keys is provided.

Present implementations include a method of secure decryption by virtualization and translation of physical encryption keys, by generating, by a key security engine, at least one key address translation index, obtaining, from a key translation memory, at least one physical mapping address based on the key address translation index and at least one virtual key address, and retrieving, from a physical key memory, at least one physical encryption key stored at the physical memory address.

Present implementations include a method of further decrypting, with the physical encryption key, a frame corresponding to a partition register.

Present implementations include a method where the partition register includes the virtual key address.

Present implementations include a method of further obtaining, from a secure register, at least one key index address map, where the key index address map corresponds to the partition register.

Present implementations include a method of obtaining the key index address map by obtaining a start address associated with the key translation memory, and obtaining a partition key count corresponding to a partition register.

Present implementations include a method of generating the key address translation index by generating an offset based on the start address, and generating a virtual address block based on the start address and the partition key count.

Present implementations include a method where the key translation memory includes a plurality of contiguous virtual key addresses including the virtual key address and associated only with the partition register.

Present implementations include a method where the physical mapping address includes a pointer to the physical memory address at the physical key memory.

Present implementations include a system of secure decryption by virtualization and translation of physical encryption keys, the system having a key translation memory operable to store at least one physical mapping address corresponding to at least one virtual key address, a physical key memory operable to store at least one physical encryption key at a physical memory address thereof, and a key security engine operable generate at least one key address translation index, obtain, from the key translation memory, the physical mapping address based on the key address translation index and the virtual key address, and retrieve, from the physical key memory, the physical encryption key stored at the physical memory address.

Present implementations include a system with a secure register operable to store at least one key index address map.

Present implementations include a system where the key security engine can obtain, from the secure register, the key index address map.

Present implementations include a system where the key security engine can obtain, from the secure register, a start address associated with the key translation memory, and obtain, from the secure register, a partition key count corresponding to a partition register.

Present implementations include a system where the key security engine can generate an offset based on the start address, and generate a virtual address block based on the start address and the partition key count.

Present implementations include a system where the key index address map corresponds to a partition register.

Present implementations include a system where the partition register includes the virtual key address.

Present implementations include a system where the key security engine can decrypt, with the physical encryption key, a frame corresponding to a partition register.

Present implementations include a system where the physical mapping address includes a pointer to the physical memory address at the physical key memory.

Present implementations include a system where the key translation memory includes a plurality of contiguous virtual key addresses including the virtual key address and associated only with the partition register.

Present implementations include a non-transitory computer-readable media storing computer-readable instructions, such that when executed, causes a processing circuit to obtain, from a secure register, at least one key index address map, the key index address map corresponding to a partition register, generate, by a key security engine, at least one key address translation index, obtain, from a key translation memory, at least one physical mapping address based on the key address translation index and at least one virtual key address, retrieve, from a physical key memory, at least one physical encryption key stored at the physical memory address, and decrypt, with the physical encryption key, a frame corresponding to the partition register.

Present implementations include a non-transitory computer-readable media where the processing circuit is caused to: obtain, from the secure register, a start address associated with the key translation memory, obtain, from the secure register, a partition key count corresponding to a partition register, generate an offset based on the start address, and generate a virtual address block based on the start address and the partition key count.

BRIEF DESCRIPTION OF THE DRAWINGS

These and other aspects and features of the present implementations will become apparent to those ordinarily skilled in the art upon review of the following description of specific implementations in conjunction with the accompanying figures, wherein:

FIG. 3 illustrates an example secure register memory further to the example system of FIG. 1.

DETAILED DESCRIPTION

Figure 1:
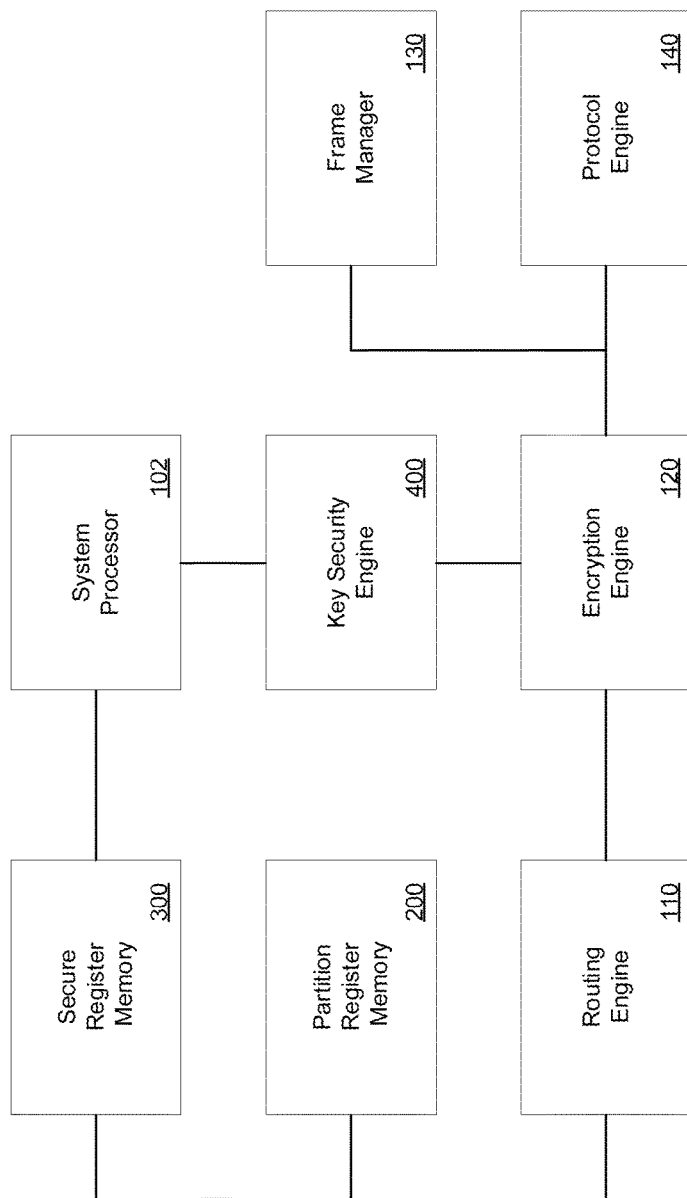
FIG. 1 illustrates an example system, in accordance with present implementations.

The present implementations will now be described in detail with reference to the drawings, which are provided as illustrative examples of the implementations so as to enable those skilled in the art to practice the implementations and alternatives apparent to those skilled in the art. Notably, the figures and examples below are not meant to limit the scope of the present implementations to a single implementation, but other implementations are possible by way of interchange of some or all of the described or illustrated elements. Moreover, where certain elements of the present implementations can be partially or fully implemented using known components, only those portions of such known components that are necessary for an understanding of the present implementations will be described, and detailed descriptions of other portions of such known components will be omitted so as not to obscure the present implementations. Implementations described as being implemented in software should not be limited thereto, but can include implementations implemented in hardware, or combinations of software and hardware, and vice-versa, as will be apparent to those skilled in the art, unless otherwise specified herein. In the present specification, an implementation showing a singular component should not be considered limiting; rather, the present disclosure is intended to encompass other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present implementations encompass present and future known equivalents to the known components referred to herein by way of illustration.

Present implementations can include multiple secure memory hardware areas, in order to provide a multilayer encryption system deployable on at least embedded communication systems for various machines. As discussed above, present implementations can provide, but are not limited to, secure communication for an automobile systems control and monitoring network. The multiple secure memory hardware areas can integrate with one or more communication protocols to provide encryption for that security protocol. The security protocol can include, but is not limited to CANsec or any variant, derivative, or the like, thereof. Network communication security hardware in accordance with present implementations can include restricted address ranges of memory addresses for various applications devices on the network, virtual addressing of memory addresses accessible by restricted address ranges, and storage of physical encryption keys at a secure memory and securely addressable by the virtual memory addresses. Thus, present implementations provide a multi-stage security hardware structure for providing tamper-resistant network communication by encrypting network communication and enforcing multiple access restrictions on retrieval of encryption keys for decryption.

FIG. 1 illustrates an example system, in accordance with present implementations. As illustrated by way of example in FIG. 1, an example system 100 includes a system processor 102, a routing engine 110, an encryption engine 120, a frame manager 130, a protocol engine 140, a partition register memory 200, a secure register memory 300, and a key security engine 400. The system 100 and one or more of the components thereof can include one or more logical or electronic devices including but not limited to integrated circuits, logic gates, flip flops, gate arrays, programmable gate arrays, and the like.

The system processor 102 can execute one or more instructions associated the system 100. The system processor 102 can include an electronic processor, an integrated circuit, or the like including one or more of digital logic, analog logic, digital sensors, analog sensors, communication buses, volatile memory, nonvolatile memory, and the like. The system processor 102 can include, but is not limited to, at least one microcontroller unit (MCU), microprocessor unit (MPU), central processing unit (CPU), graphics processing unit (GPU), physics processing unit (PPU), embedded controller (EC), or the like. The system processor 102 can include a memory operable to store or storing one or more instructions for operating components of the system processor 102 and operating components operably coupled to the system processor 102. The one or more instructions can include at least one of firmware, software, hardware, operating systems, embedded operating systems, and the like. The system processor 102 or the system 100 generally can include at least one communication bus controller to effect communication between the system processor 102 and the other elements of the system 100.

The routing engine 110 can route communication between one or more of the encryption engine 120, the frame manager 130, the protocol engine 140, the partition register memory 200, the secure register memory 300, and the key security engine 400. The routing engine can be operatively coupled with a communication bus, channel, or the like including a transmission bus, channel, or the like, and a receiving bus, channel, or the like. As one example, a communication bus can operatively couple the routing engine 110 to the protocol engine 140. The key security engine 400 and the encryption engine 120 can also be operatively coupled to the routing engine by at least the communication bus. The communication bus can terminate at the routing engine, can include one or more queues, registers, or buffer devices to control scheduling, ordering, and prioritization, for example. As one example, the routing engine 110 can include a first queue device operatively coupled with a transmission channel of the communication bus, and a second queue device operatively coupled with a receiving channel of the communication bus. The queue device or devices can include, for example, a first-in-first-out (FIFO) queue, but is not limited thereto.

The encryption engine 120 can encrypt and decrypt one or more objects at least transmitted by the communication bus to or through the encryption engine 120. The encryption engine can include one or more encryption devices operable to transform an unencrypted communication into an encrypted communication by the transmission channel, and to transform an encrypted communication into an unencrypted communication by the receiving channel. As one example, the encryption engine 120 can encrypt and decrypt in accordance with an AES encryption and decryption scheme. The encryption engine 120 can include one or more logical or electronic devices including but not limited to integrated circuits, logic gates, flip flops, gate arrays, programmable gate arrays, and the like. It is to be understood that any electrical, electronic, or like devices, or components associated with the encryption engine 120 can also be associated with, integrated with, integrable with, replaced by, supplemented by, complemented by, or the like, the key security engine 400 or any component thereof.

The frame manager 130 can control or restrict, for example, communication received from the protocol engine by the protocol engine 140. The frame manager 130 can, for example, filter communication received from the protocol engine 140 based on one or more acceptance criteria to the system. As one example, any communication not satisfying at least one acceptance criterion can be filtered or blocked from continuing along the receiving bus and reaching one or more of the encryption engine 120 and the routing engine 110. An acceptance criterion can include an origin stamp, a timestamp, a hash, or a security token, for example. The frame manager 130 can also include a filter memory device to store filtered or blocked communication. The filter memory device can include one or more registers, arrays, flip flops, or the like.

The protocol engine 140 can receive and transmit communication in accordance with one or more particular protocols. The protocol engine 140 can include a network interface to operatively couple the system 100 to a network operable in accordance with at least one protocol compatible with the protocol engine. As one example, the protocol engine can be compatible with at least a CAN-XL protocol, a CANsec protocol, or any variant or derivation thereof. As another example, the protocol engine 140 can be compatible with any vehicle network or embedded network, for example.

The partition register memory 200 can store one or more blocks associated with one or more partitions of storage system operatively coupled with the system 100. The partition register memory 200 can include one or more identifiers, encryption keys, and transmission control instructions associated with one or more partitions. The partition register memory 200 can include a plurality of partition registers, each including block associated with a corresponding partition of the plurality of partitions. As one example, partitions can be numerically identified by number, from 0 through N, in increments of 1. Each of the partition registers of the partition register memory 200 can include one or more virtual addresses corresponding to one or more encryption keys. Thus, the partition register memory 200 can reference one or more encryption keys corresponding to particular partitions. Each partition can also be associated with one or more particular virtual machines executable in communication with the partition register memory and the system 100. A virtual machine associated with each partition can be restricted to execution within that partition, and can further be restricted to access only the encryption keys indicated by the virtual addresses in that partition. Thus, the partition register memory 200 can provide restricted access to one or more encryption keys with respect to one or more virtual machines executable on particular partitions.

The secure register memory 300 can store one or more virtual address ranges for virtual keys associated with each partition. As one example, the secure register memory 300 can store one or more address ranges associated with one corresponding partitions. Each partition can be associated with a particular set of one or more virtual key addresses corresponding to various physical encryption keys stored the key security engine. The secure register memory 300 can include one or more hardware memory devices to store binary data, digital data, or the like. The secure register memory 300 can include one or more electrical components, electronic components, programmable electronic components, reprogrammable electronic components, integrated circuits, semiconductor devices, flip flops, arithmetic units, or the like.

The key security engine 400 can include one or more memory devices to translate virtual addresses to physical key addresses. The key security engine 400 can control, restrict or block, for example, access from devices external to the system, and can provide direct addressing only to particular virtual machines authorized by their corresponding partition registers to access particular virtual address ranges of the key security engine 400. The key security engine 400 can also include a mapping structure between virtual address and physical address. The mapping structure can include pointers stored at particular memory array locations. The pointers can include physical memory addresses for particular physical encryption keys. Each of the particular physical encryption keys accessible by the virtual address can be retrieved by a particular virtual machine to decrypt any component of any communication associated with, or by, for example, that virtual machine. The communication can include a frame transmitted by the virtual machine and received at the protocol engine 140. The key security engine 400 can include one or more hardware memory devices to store binary data, digital data, or the like. The key security engine 400 can include one or more electrical components, electronic components, programmable electronic components, reprogrammable electronic components, integrated circuits, semiconductor devices, flip flops, arithmetic units, or the like.

The system 100 can include a communication interface operatively coupling one or more of the components thereof. The communication interface can communicate one or more instructions, signals, conditions, states, or the like between one or more components of the system 100 and components, devices, blocks operatively coupled or couplable therewith. The communication interface can include one or more digital, analog, or like communication channels, lines, traces, or the like. As one example, the communication interface can include at least one serial or parallel communication line among multiple communication lines of a communication interface. The communication interface can include one or more wireless communication devices, systems, protocols, interfaces, or the like. The communication interface can include one or more logical or electronic devices including but not limited to integrated circuits, logic gates, flip flops, gate arrays, programmable gate arrays, and the like. The communication interface can include ones or more telecommunication devices including but not limited to antennas, transceivers, packetizers, and wired interface ports.

Figure 2:
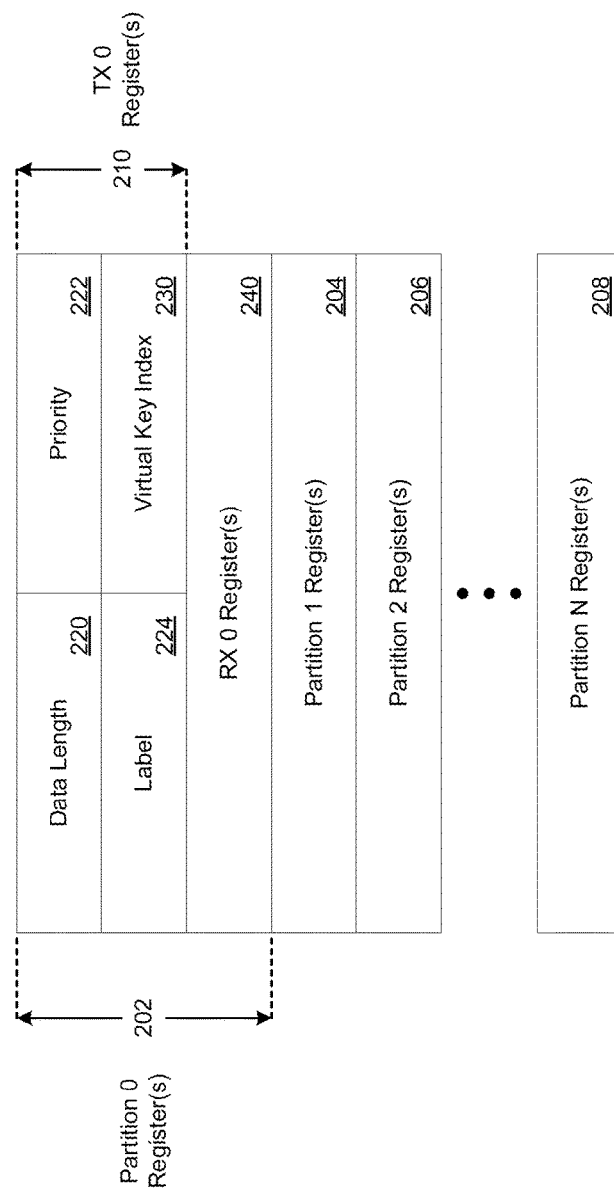
FIG. 2 illustrates an example partition register memory further to the example system of FIG. 1.

FIG. 2 illustrates an example partition register memory further to the example system of FIG. 1. As illustrated by way of example in FIG. 2, an example partition register memory 200 includes one or more partition registers 202 associated with a first partition, including one or more transmission registers 210 associated with the first partition, and one or more receiving registers 240 associated with the first partition. The partition register memory 200 can also include one or more partition registers 204, 206, and 208 of an arbitrary number, where each of the additional partition registers can correspond to the partition register 202 in one or more of structure and operation as discussed below. Each of the registers can include one or more memory arrays, flip flops, gate arrays, accumulators, or the like, and can be operable to store one or more digital bits, nibbles, bytes, words, or the like.

The transmission registers 210 can control one or more parameters associated with a transmission communication by a virtual machine or application, for example, associated with a particular partition. The transmission registers 210 can include a data length block, 220 a priority block 222, a frame source pointer block 224, a label block 226, and a virtual key index block 230. Each block can include a separate register or a portion of a register. A portion of a register can include a particular address range of a register.

The data length block 220 can include a physical memory location storing an indication of the total length or size, for example, of a particular frame communicated by a virtual machine with the system 100. The priority block 222 can include a physical memory location storing an indication of a priority, ranking, or order, for example, of a particular frame communicated by a virtual machine with the system 100. The label block 226 can include a physical memory location storing an identifier or unique identifier, for example, of a particular frame communicated by a virtual machine with the system 100.

The virtual key index block 230 can include a physical memory location storing an indication of at least one virtual address corresponding to a physical encryption key associated with the partition for the partition register. The virtual key index block 230 can include a number of virtual key address locations associated with the partition, and a particular order of virtual keys and identifiers for the virtual keys, for example, corresponding to the order. Thus, the numbered order for each virtual key in the virtual key index block 230 can be retrieved to generate an offset within the partition for an individual virtual key address within the virtual key index block 230. By indicating a number of virtual key locations, the virtual key index block 230 can advantageously indicate a correspondence to an arbitrary number of physical encryption keys without requiring the storage space required to store virtual addresses, and without insecurely storing memory location of physical encryption keys directly.

The receiving registers 240 can control one or more parameters associated with a receiving communication by a virtual machine or application, for example, associated with a particular partition. The receiving registers 240 can correspond in one or more of structure and operation to the transmission registers 210. The receiving registers can indicate at least one virtual key index corresponding to the virtual key index 230, where separate keys can respectively perform encryption and decryption operations with respect to a particular frame or virtual machine, for example. The receiving registers 240 can access the virtual key index 230 can forego the need to store additional keys, where identical keys can perform both encryption and decryption in accordance with the protocol correspond to the partition register.

FIG. 3 illustrates an example secure register memory further to the example system of FIG. 1. As illustrated by way of example in FIG. 3, an example secure register memory 300 includes at least one key start address register 310 and one or more partition key count registers 320, 322, 324 and 326 associated with one or more corresponding partitions. Each of the key count registers 320, 322, 324 and 326 can correspond to each other in one or more of structure and operation as discussed below.

The key start address register 310 can include a physical memory location storing a physical address indicating the start of a contiguous block of one or more virtual addresses corresponding to physical encryption keys. The addresses can be stored contiguously to minimize addressing space required to store addresses. This is particularly advantageous in embedded systems where low power and low capacity devices are advantageously for miniaturization and field deployment. Thus, the key start address register 310 can include a full physical address and can eliminate the need for the count registers 320, 322, 324 to store corresponding full physical addresses and reserve the bits required to do so.

The key count registers 320, 322, 324 and 326 can include a physical memory location storing the count of one or more virtual keys associated with one or more partition registers. As one example, the key count registers 320, 322, 324 can respectively store key counts of 2, 5 and 10, indicating that 2 keys are associated with a first partition (Partition 0), 5 keys are associated with a second partition (Partition 1), and 10 keys are associated with a third partition (Partition 1). Thus, the key security engine 400 can generate addresses for each of the virtual keys, by their order within a partition range, and the start address of the of key start address register. Specifically the key security engine 400 can generate an offset for a particular virtual key based on the start address and an offset from the start address to the address for a particular virtual key based on count across all of the key count registers 320, 322, 324 and 326.

The secure register memory 200 can include one or more hardware memory devices to store binary data, digital data, or the like. The secure register memory 200 can include one or more electrical components, electronic components, programmable electronic components, reprogrammable electronic components, integrated circuits, semiconductor devices, flip flops, arithmetic units, or the like. The secure register memory 200 can include at least one of a non-volatile memory device, a solid-state memory device, a flash memory device, and a NAND memory device. The secure register memory 200 can include one or more addressable memory regions disposed on one or more physical memory arrays. A physical memory array can include a NAND gate array disposed on, for example, at least one of a particular semiconductor device, integrated circuit device, and printed circuit board device.

Figure 4:
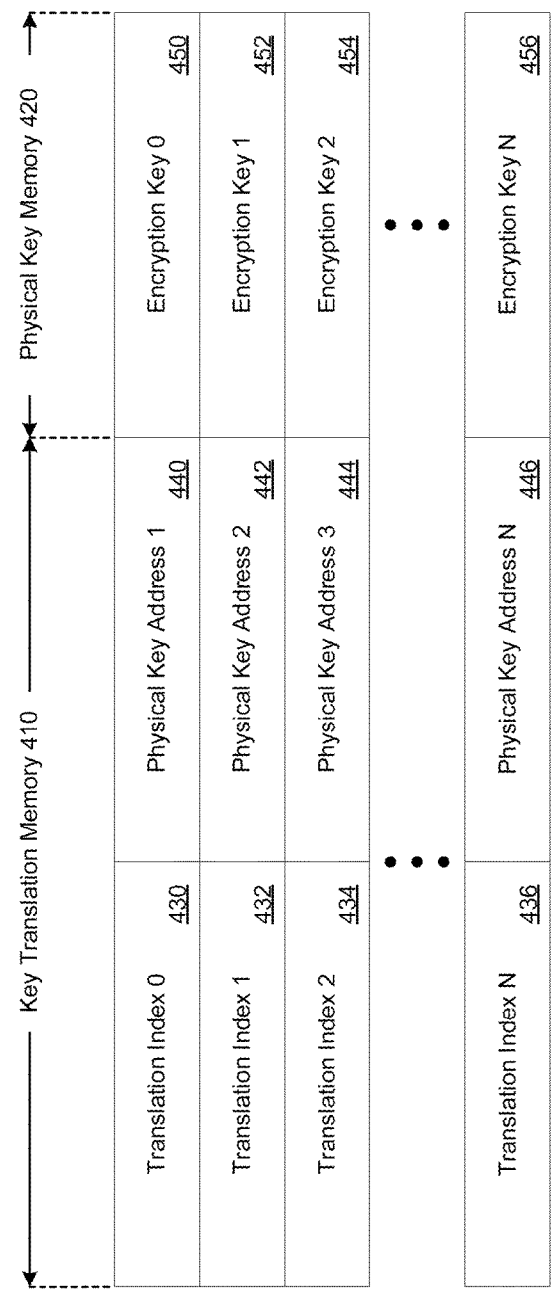
FIG. 4 illustrates an example key security engine further to the example system of FIG. 1.

FIG. 4 illustrates an example key security engine further to the example system of FIG. 1. As illustrated by way of example in FIG. 4, an example key security engine 400 includes a key translation memory 410 and a physical key memory 420. It is to be understood that the key security engine can include a system processor corresponding in one or more of structure and operation to the system processor 102, and can perform one or more operations associated with one or more of the key translation memory 410 and the physical key memory 420 thereby. Thus, the key security engine 400 can advantageously perform secure encryption key operations under control of at least one of the system processor 102 and a system processor of the key security engine 400.

The key translation memory 410 can link at least one virtual key address to at least one corresponding physical key address. The key translation memory 410 can store data associated with the key security engine 400. The key translation memory 410 can include one or more hardware memory devices to store binary data, digital data, or the like. The key translation memory 410 can include one or more electrical components, electronic components, programmable electronic components, reprogrammable electronic components, integrated circuits, semiconductor devices, flip flops, arithmetic units, or the like. The key translation memory 410 can include at least one of a non-volatile memory device, a solid-state memory device, a flash memory device, and a NAND memory device. The key translation memory 410 can include one or more addressable memory regions disposed on one or more physical memory arrays. A physical memory array can include a NAND gate array disposed on, for example, at least one of a particular semiconductor device, integrated circuit device, and printed circuit board device. The key translation memory 410 can include one or more key translation indices 430, 432, 434 and 436 and one or more physical key addresses 440, 442, 444 and 446.

The key translation indices 430, 432, 434 and 436 can include one or more physical memory locations storing corresponding indices to the virtual key addresses of the secure register memory 300. Thus, the secure register memory 200 can point to various ranges of the key translation indices 430, 432, 434 and 436 corresponding to various partition registers. The key translation indices can correspond to physical memory address of the key translation memory.

The physical key addresses 440, 442, 444 and 446 can include one or more physical memory locations storing physical key addresses corresponding to respective ones of the key translation indices 430, 432, 434 and 436. The physical key addresses can store pointers for particular physical encryption keys stored at memory locations of the physical key memory at particular addresses thereof. Thus, the key translation indices 430, 432, 434 and 436 can advantageously address any physical encryption key regardless of that physical encryption key's location, address, or order, for example, in the physical key memory. The key translation indices 430, 432, 434 and 436 can also advantageously address any key, multiple keys, or no keys as required for a particular application or security requirement, for example. As one example, multiple physical key addresses 440, 442, 444 and 446 can store pointers to the same physical encryption key. As another example, addresses for one or more physical encryption keys can be absent from all physical key addresses 440, 442, 444 and 446. Thus, the key translation indices 430, 432, 434 and 436 can have, but are not limited to a one-to-one mapping correspondence with the physical key addresses 440, 442, 444 and 446.

The physical key memory cells 450, 452, 454 and 456 can include one or more physical memory locations storing encryption key keys corresponding to respective ones of the physical key addresses 440, 442, 444 and 446. Each encryption key can be or include a symmetric or an asymmetric key, for example, and can be stored at the corresponding cell of the physical key memory 420. As one example, the encryption key can correspond to an AES encryption protocol or the like, but is not limited thereto. The key security engine can retrieve the encryption keys stored at the physical key memory cells 450, 452, 454 and 456 and can perform one or more encryption and decryption operations associated with a frame or communication associated with the system 100 or any device or system operatively coupled therewith.

The physical key memory 420 can store data associated with the key security engine 400 and can include one or more physical key memory cells 450, 452, 454 and 456. The physical key memory 420 can include one or more hardware memory devices to store binary data, digital data, or the like. The physical key memory 420 can include one or more electrical components, electronic components, programmable electronic components, reprogrammable electronic components, integrated circuits, semiconductor devices, flip flops, arithmetic units, or the like. The physical key memory 420 can include at least one of a non-volatile memory device, a solid-state memory device, a flash memory device, and a NAND memory device. The physical key memory 420 can include one or more addressable memory regions disposed on one or more physical memory arrays. A physical memory array can include a NAND gate array disposed on, for example, at least one of a particular semiconductor device, integrated circuit device, and printed circuit board device.

Figure 5:
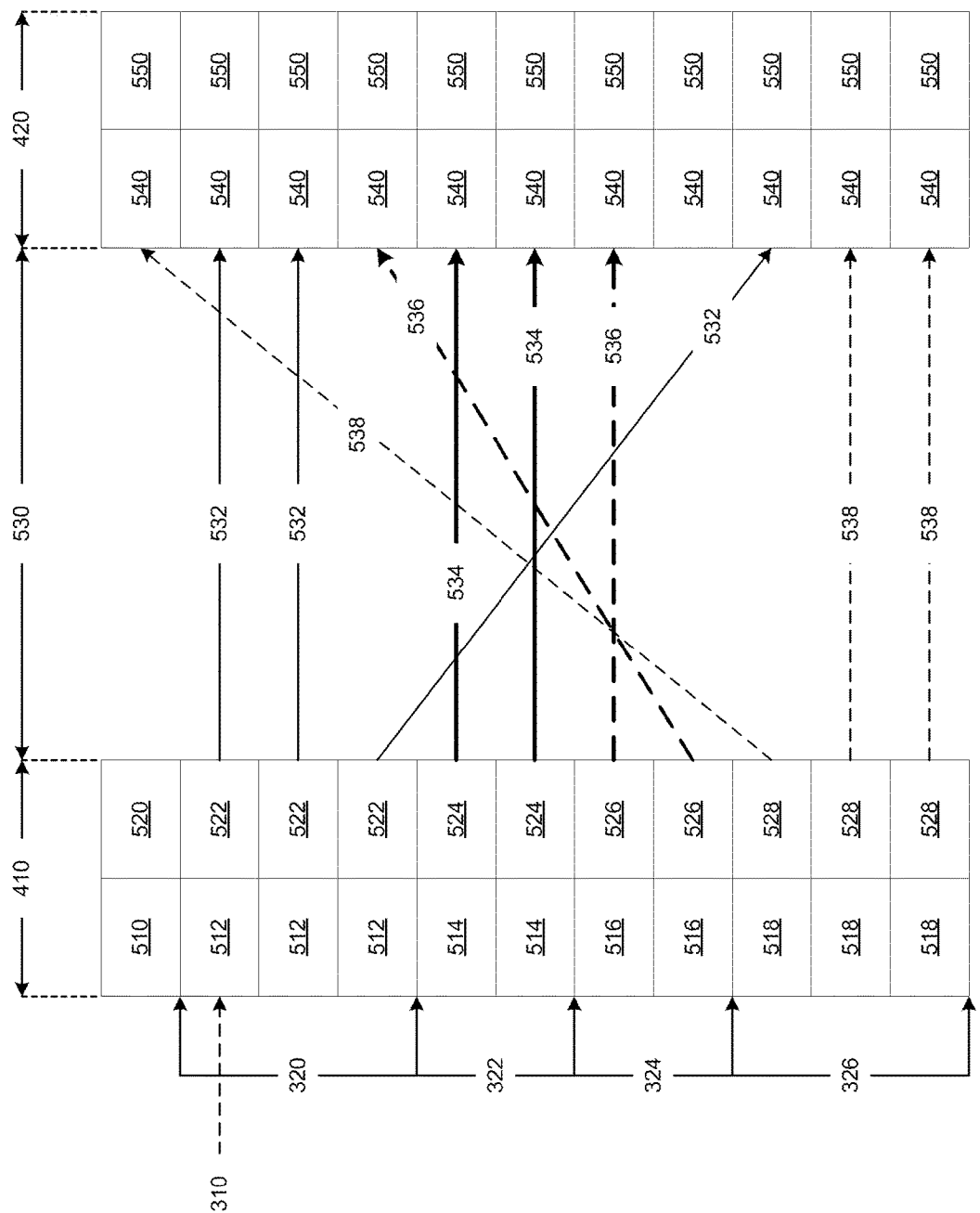
FIG. 5 illustrates an example physical key address mapping structure, in accordance with present implementations.

FIG. 5 illustrates an example physical key address mapping structure, in accordance with present implementations. As illustrated by way of example in FIG. 5, an example physical key address mapping structure 500 includes the key translation memory 410, the physical key memory 420, and a mapping structure 530 therebetween.

The key translation memory 410 can include one or more key translation address blocks 510, 512, 514, 516 and 518, each associated with a corresponding one of or none of the partition register blocks 320, 322, 324 and 326, and can include one or more physical key address blocks 520, 522, 524, 526 and 528, each also associated with a corresponding one of or none of the partition register blocks 320, 322, 324 and 326.

The key translation address blocks 510, 512, 514, 516 and 518 can correspond in one or more of structure and operation to the key translation indices 430, 432, 434 and 436. In some implementations, the key translation address blocks 510, 512, 514, 516 and 518 include one or more of the key translation indices 430, 432, 434 and 436. The key translation address block 510 can be before a start address indicated by the key start address register 310, and can thus be excluded from an address range of virtual keys available to the partitions 320, 322, 324 and 326. The key translation address blocks 512, 514, 516 and 518 can respectively be associated with partitions 320, 322, 324, 326 and 328, in accordance with their corresponding key count number as discussed above. As one example, the key counts of virtual key indices of partitions 320, 322, 324 and 326 can respectively be 3, 2, 2 and 3. It is to be understood that implementations in accordance with present implementations can advantageously support an arbitrary number of virtual key indices.

The physical key address blocks 520, 522, 524, 526 and 528 can correspond in one or more of structure and operation to the physical key addresses 440, 442, 444 and 446. In some implementations, the physical key address blocks 520, 522, 524, 526 and 528 include one or more of the physical key addresses 440, 442, 444 and 446. The physical key address blocks 520, 522, 524, 526 and 528 can identify a mapping structure among the mapping structure 530 to one or more physical mapping address blocks 550 of the physical key memory. Each of the key translation address blocks 510, 512, 514, 516 and 518 and the physical key address blocks 520, 522, 524, 526 and 528 can include respective memory arrays have corresponding addresses, to provide a direct mapping correlation between corresponding memory locations thereof. As one example, the key translation address block, 512 can have a memory address of 0×1000 at a first memory array of the key translation memory 410, and the physical key address blocks 522 can have a corresponding memory address of 0×1000 at a second memory array of the key translation memory 410. It is to be understood that present implementations are not limited to multiple memory arrays sharing addresses as discussed above.

The mapping structure 530 can include one or more traversable links to the physical mapping address blocks 540, based on the physical key address blocks 520, 522, 524, 526 and 528. The physical key address blocks 520, 522, 524, 526 and 528 can each respectively include address structured and operable as pointers 532, 534, 536 and 538 based on their respective partitions. Pointers 532, 534, 536 and 538 can each be associated respectively with first, second third, and fourth partitions by partition registers 320, 322, 324 and 326. It is to be understood that any pointer can point to any of physical key address blocks 520, 522, 524, 526 and 528, and that any of the physical key address blocks 520, 522, 524, 526 and 528 can have any number of pointers, including but not limited to zero pointers, associated therewith. This flexibility in pointing assignment advantageously provides use of any encryption key stored at the physical key storage blocks 550 to be available for access by the key security engine 400 with respect to any virtual machine or application, for example, associated with any partition.

The physical mapping address blocks 540 can correspond in one or more of structure and operation to the physical key addresses 440, 442, 444 and 446. In some implementations, the physical mapping address blocks 540 include one or more of the physical key addresses 440, 442, 444 and 446. The physical mapping address blocks 540 can correspond to physical addresses of a memory array of the physical key memory 420. The physical key storage blocks 550 can correspond in one or more of structure and operation to the physical key memory cells 450, 452, 454 and 456. In some implementations, the physical key storage blocks 550 include one or more of the physical key memory cells 450, 452, 454 and 456. The physical key storage blocks 550 can correspond to physical addresses of a memory array of the physical key memory 420. Each of the physical mapping address blocks 540 and the physical key storage blocks 550 can include respective memory arrays have corresponding addresses, to provide a direct mapping correlation between corresponding memory locations thereof. It is to be understood that present implementations are not limited to multiple memory arrays sharing addresses as discussed above.

Figure 6:
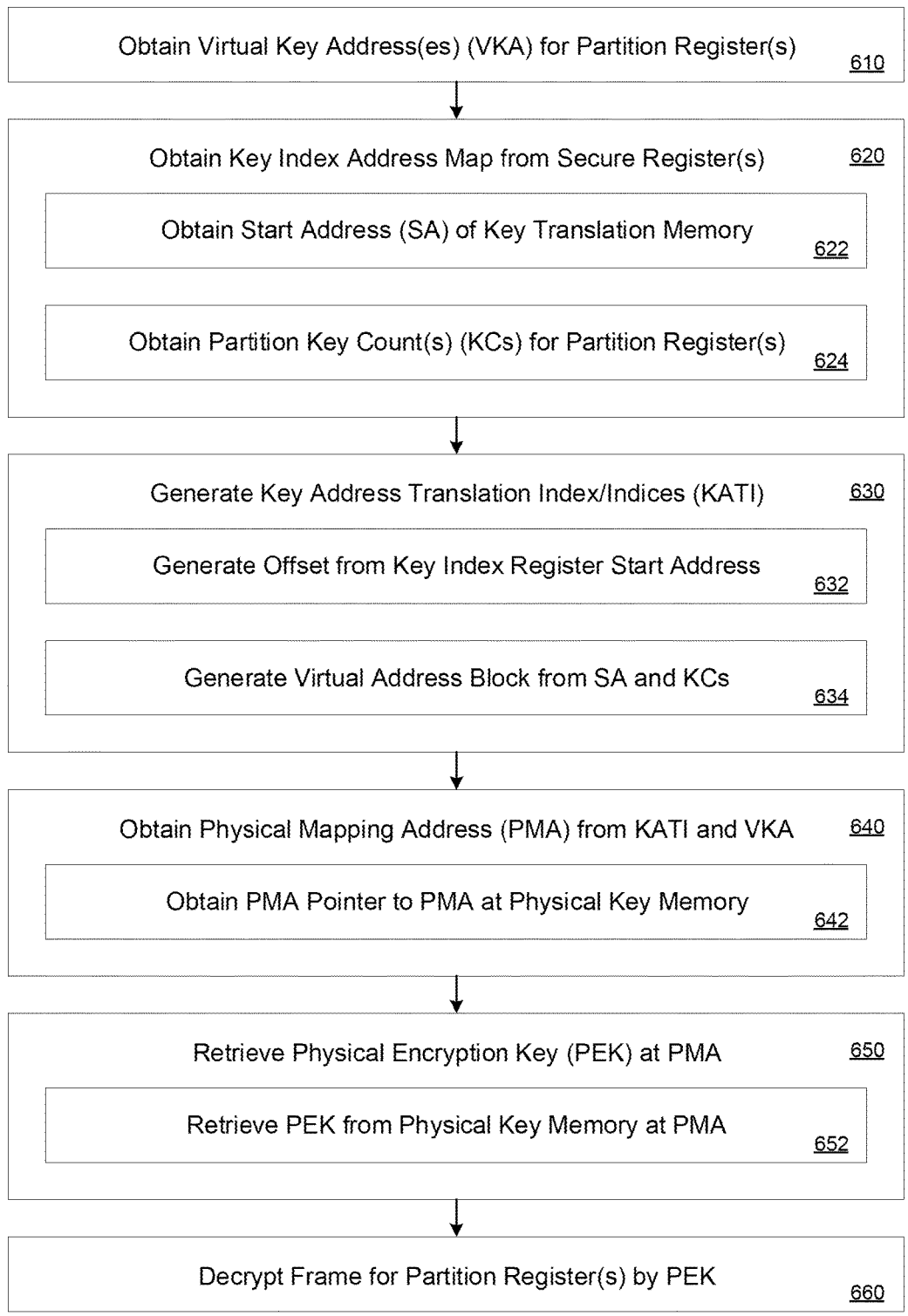
FIG. 6 illustrates an example method of secure decryption by virtualization and translation of physical encryption keys, in accordance with present implementations.

FIG. 6 illustrates an example method of secure decryption by virtualization and translation of physical encryption keys, in accordance with present implementations. In some implementations, the example system 100 performs method 600 according to present implementations. In some implementations, the method 600 begins at step 610.

At step 610, the example system obtains one or more virtual key addresses corresponding to one or more partition registers. The system can obtain the virtual key addresses by identifying the partition associated with the partition register table. The method 600 then continues to step 620.

At step 620, the example system obtains at least one key index address map from at least one secure register. The key index map can include one or more virtual addresses corresponding to one or more encryption keys at the encryption key engine 400. In some implementations, step 620 includes at least one of steps 622 and 624. At step 622, the example system obtains at least one start address corresponding to a key translation memory. At step 624, the example system obtains at least one partition key count corresponding to at least one partition register. The system can obtain a partition key count in response to a request for decryption originating from a virtual machine or the like associated with a particular partition, or partition register, for example. The method 600 then continues to step 630.

At step 630, the example system generates at least one key address translation index. The key address translation index can indicate the particular virtual address corresponding to a particular encryption key included in a decryption request. The decryption request can originate from the key security engine 400 or the encryption engine 120 in response to identifying a frame, communication, or the like, associated with a particular partition. A virtual machine originating the frame can be associated with the partition, and receipt of a frame identifying a particular partition or virtual machine can trigger to decryption request. In some implementations, step 630 includes at least one of steps 632 and 634. At step 632, the example system generates at least one offset from at least one key index register start address. The offset can be generated by the key security engine 400 by adding the offset of all partitions preceding the partition associated with the request to generate a partition offset, and by adding the index number of the requested virtual key from the partition register's virtual key index to the partition offset to generate the virtual key address. At step 634, the example system generates at least one virtual address block based on the start address and the partition key count. The virtual address block can include the entire range of virtual addresses corresponding to the virtual keys index for the partition. As one example, the virtual address block can start at the virtual key address and end at an offset to the virtual key address corresponding to the number of keys associated with the partition. The method 600 then continues to step 640.

At step 640, the example system obtains at least one physical mapping address from the key address translation index and the virtual key address. The system can obtain the physical mapping address by obtaining an address at a memory location of the key translation memory as discussed above. In some implementations, step 640 includes step 642. At step 642, the example system obtains a physical mapping address that points to a physical mapping address at the physical key memory. The physical mapping address can correspond to a pointer among the pointers 532, 534, 536 and 538. The method 600 then continues to step 650.

At step 650, the example system retrieve at least one physical encryption key stored at the physical mapping address. The key security engine 400 can obtain one physical encryption key from a physical key storage block among the physical key storage blocks 550 that corresponds to the obtained physical mapping address. In some implementations, step 650 includes step 652. At step 652, the example system retrieves a physical encryption key corresponding to the physical mapping address. The physical encryption key can include an AES encryption key, a decryption key in accordance with an AES encryption protocol, and the like. The method 600 then continues to step 660.

At step 660, the example system decrypts a frame correspond to the partition or partition register associated with the original request, by the retrieved physical encryption key. It is to be understood that the encryption engine 120 can decrypt any portion of any communication associated with a particular partition, and is not limited to decrypting a frame originating from a virtual machine associated with a particular partition. The encryption engine can be integrated within the key security engine to advantageously provide encryption and decryption operations within a secure perimeter of the key security engine 400. In some implementations, the method 600 ends at step 660.

The herein described subject matter sometimes illustrates different components contained within, or connected with, different other components. It is to be understood that such depicted architectures are illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Further, unless otherwise noted, the use of the words "approximate," "about," "around," "substantially," etc., mean plus or minus ten percent.

The foregoing description of illustrative implementations has been presented for purposes of illustration and of description. It is not intended to be exhaustive or limiting with respect to the precise form disclosed, and modifications and variations are possible in light of the above teachings or may be acquired from practice of the disclosed implementations. It is intended that the scope of the invention be defined by the claims appended hereto and their equivalents.

What is claimed is:

1. A method of secure decryption by virtualization and translation of physical encryption keys retrieved by a particular virtual machine, the method comprising:
   generating, by a key security engine, at least one key address translation index, by generating an offset based on a start address, and generating a virtual address block based on the start address and a partition key count;
   obtaining, from a key translation memory, memory associated with the start address, at least one physical mapping address based on the key address translation index and at least one virtual key address;
   retrieving, from a physical key memory, at least one physical encryption key stored at a physical memory address;
   decrypting, with the physical encryption key, a frame corresponding to a partition register related to the particular virtual machine; and
   obtaining, from a secure register, at least one key index address map by obtaining the start address, and obtaining a partition key count corresponding to the partition register, the key index address map corresponding to the partition register.

2. The method of claim 1, wherein the partition register includes the virtual key address.

3. The method of claim 2, wherein the key translation memory includes a plurality of contiguous virtual key addresses including the virtual key address and associated only with the partition register.

4. The method of claim 1, wherein the physical mapping address comprises a pointer to the physical memory address at the physical key memory.

5. A system of secure decryption by virtualization and translation of physical encryption keys retrieved by a particular virtual machine, the system comprising:
   a secure register configured to store at least one key index address map;
   a key translation memory operable to store at least one physical mapping address corresponding to at least one virtual key address;
   a physical key memory configured to store at least one physical encryption key at a physical memory address thereof; and
   a key security engine configured to generate at least one key address translation index, obtain, from the key translation memory, the physical mapping address based on the key address translation index and the virtual key address, and retrieve, from the physical key memory, the physical encryption key stored at the physical memory address,
   the key security engine further configured to obtain, from the secure register, the key index address map, obtain, from the secure register, a start address associated with the key translation memory, and obtain, from the secure register, a partition key count corresponding to a partition register related to the particular virtual machine,
   the key security engine further configured to generate an offset based on the start address, and generate a virtual address block based on the start address and the partition key count.

6. The system of claim 5, wherein the key index address map corresponds to a partition register.

7. The system of claim 5, wherein the partition register includes the virtual key address.

8. The system of claim 5, the key security engine further operable to: decrypt, with the physical encryption key, a frame corresponding to a partition register.

9. The system of claim 5, wherein the physical mapping address comprises a pointer to the physical memory address at the physical key memory.

10. The system of claim 5, wherein the key translation memory includes a plurality of contiguous virtual key addresses including the virtual key address and associated only with the partition register.

* * * * *